March 29, 1960  J. W. CARNWATH ET AL  2,930,560
MATERIAL HANDLING PALLET

Filed July 24, 1956  2 Sheets-Sheet 1

INVENTORS
JOSEPH W. CARNWATH
& ROBERT CARNWATH, Jr.
BY

ATTORNEYS

March 29, 1960 J. W. CARNWATH ET AL 2,930,560
MATERIAL HANDLING PALLET
Filed July 24, 1956 2 Sheets-Sheet 2

INVENTORS
JOSEPH W. CARNWATH
& ROBERT CARNWATH, Jr.
BY
ATTORNEYS

United States Patent Office 2,930,560
Patented Mar. 29, 1960

2,930,560

MATERIAL HANDLING PALLET

Joseph W. Carnwath, Wyncote, and Robert Carnwath, Jr., Jenkintown, Pa.

Application July 24, 1956, Serial No. 599,770

2 Claims. (Cl. 248—120)

This invention relates to a material handling pallet and more particularly to a pallet formed from flat members providing upper and lower surfaces and spaced sufficiently to provide for entry of the forks of a fork lift truck as is customarily employed for handling loaded pallets.

Numerous constructions are currently employed for pallets of this type. In each of these constructions, however, there is involved the problem of providing spacing means between members forming the upper and lower surfaces of the pallet and means assembling and securing the upper and lower surfaces forming materials to the spacers. It will be evident that, as in any structure, there are involved in these structures the considerations of cost of materials and labor cost of assembly. There is also involved the usual problems of storing the manufactured pallets prior to their use.

It is one object of this invention to provide an improved pallet construction by means of which the cost of materials in the pallet is substantially reduced and the cost of the labor involved in the assembly of the pallet is substantially reduced from those costs incurred in the more conventional pallet construction.

It is a further object of this invention to provide a strong, rugged pallet which can be assembled in a minimum of time.

It is a further object of the invention to provide a pallet which may be collapsed in order to permit storage of the pallet in a minimum of space.

It is a further object of the invention to provide a slatted pallet adapted to receive a cover panel which is held in position on the pallet by the weight of material stacked thereon.

These and other objects of the invention relating particularly to details of construction of the pallet will become evident from the following description when read in conjunction with the accompanying drawings in which.

Figure 1:
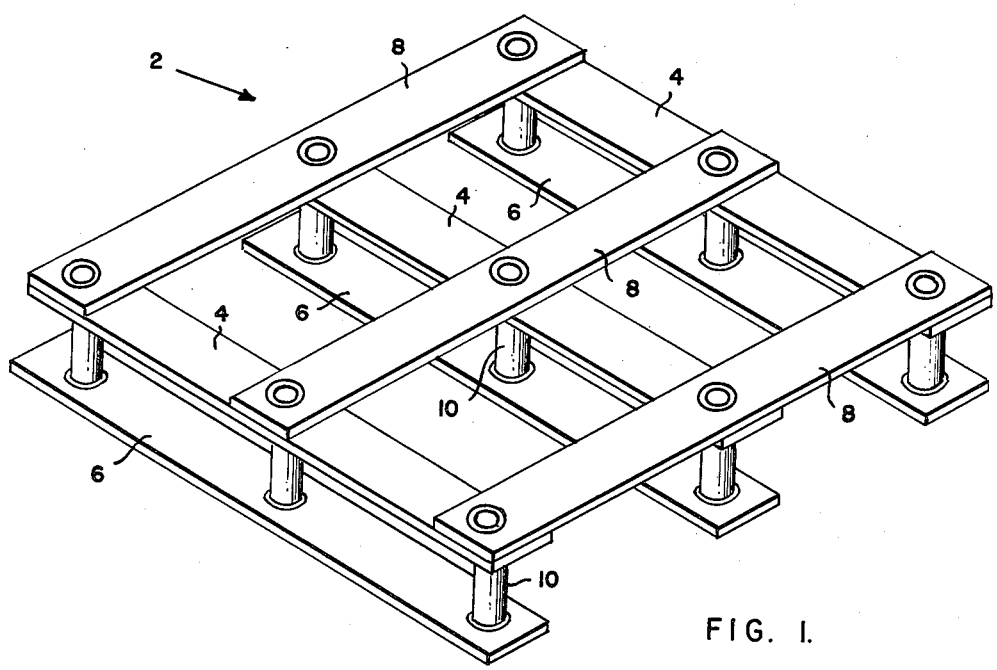
Figure 1 is a perspective view of the assembled pallet.

In Figure 1 there is shown generally at 2 an assembled pallet embodying the invention. The pallet is preferably constructed with spaced parallel pairs of slats 4 and 6 forming upper and lower sides of the pallet. The upper side of the pallet as shown in Figure 1 includes transversely extending slats 8 which serve to fix the pairs of slats 4 and 6 in spaced relation. The slats 4 and 8 are held in fixed relation with each other and slats 4 and 6 are held in spaced relation with each other by means of cylindrical joiner-spacers 10.

Figure 2:
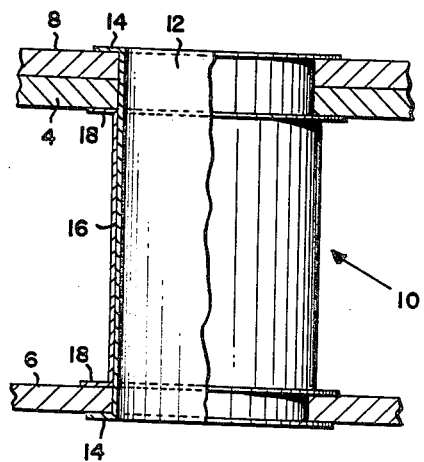
Figure 2 is a transverse section taken on a vertically extending plane through a fragmentary portion of the structure shown in Figure 1.

As shown more clearly in Figure 2 in the preferred embodiment of the invention these cylindrical parts involve an inner cylindrical member 12 having upper and lower radially outwardly extending flanges 14 and an outer cylindrical member 16 having upper and lower outwardly extending radial flanges 18. It will be evident from viewing Figure 2 that the cylindrical member 16 and its flanges 18 serve to space the slats 4 and 6 and the inner cylindrical member 12 which extends through the slats serves, by means of its radially extending flanges 14, to retain the slats in engagement with the flanges 18.

The slats 4, 6 and 8 are preferably made of wood, plywood or fiberboard though they may be made of other suitable materials without departing from the invention. Similarly, if desired, transversely extending slats such as the slats 8 may be added across the slats 6. This and other modifications to the arrangement of slats shown in Figure 1 may be provided without departing from the invention.

The cylindrical support and spacing members 12 and 16 are preferably formed of light gauge sheet metal. In the assembly of the pallet the spacer cylinder 16 will be prefabricated with radially extending flanges 18 at both of its ends. However, the cylindrical member 12 will be prefabricated with the radially extending flange 14 formed at only one of its ends. At the time of assembly of the pallet after the slats 6, 4 and 8 have been assembled with the cylinders 16 and 12, the uppermost flange 14 of the cylinder 12 will be turned down to secure the pallet in an assembled condition. While the inner cylindrical member must be formed of some suitable material of which the uppermost flange 14 can be conveniently turned down at the time of assembly, the outer sleeve 16 may be formed of metal, plastic or fibrous tubular materials and any other suitable materials which would provide the necessary compressive strength for the spacer and would provide a sufficient bearing flange against the inner surfaces of the inner slats 4 and 6.

From the foregoing it will be evident that the assembly of the parts involved in the pallet will be readily accomplished and the only operations involved at final assembly are the stacking of the various parts in their proper relations and the flanging of the upper ends of the cylinders 12. It may at this time be noted that either the longitudinally extending slats 4 or the transversely extending slats 8 may be positioned uppermost. In the embodiment shown the slats 8 are positioned uppermost. This is the preferable arrangement in combination with the structure shown in which only transversely extending slats are employed on the lower side of the pallet. This permits the entry of the iron forks of a fork-lift truck without adversely affecting transversely extending slats on the lower surface of the pallet. In other words, the forks of the fork-lift truck may be slid along the floor or supporting surface upon which the pallet is resting without danger of damage to the slats of the pallet. After the forks have been entered in the pallet and the forks are raised, the forks will engage the under surface of the slats 8 upon which the load is resting and thus no unnecessary deflection of these slats occurs such as would occur if in the same arrangement the slats 4 were positioned above the slats 8 and the fork of the fork-lift truck were to engage the slats 4 and the load be bearing upon the slats 8.

Figure 3:
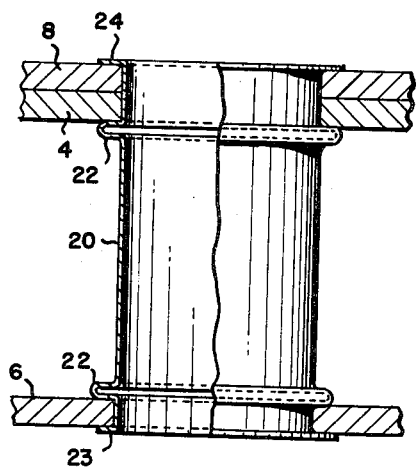
Figure 3 is a transverse section taken on the same trace as Figure 2 and showing an alternative embodiment of the invention.

An alternative embodiment of the invention is shown in Figure 3 in which slats 4, 6 and 8 are assembled in spaced relation by means of a single cylindrical member 20 provided with beads 22 adjacent to and spaced from its ends. Upon assembly of the pallet the slats 4 and 8 are placed against the uppermost bead 22 and the slats 6 against the lower bead 22 and thereafter the upper and lower radially extending flanges 24 are formed to secure the slats in position on the cylindrical member 20 against the bead 22. While this arrangement has the slight advantage of involving one less part, it has the disadvantage of requiring two flange forming operations at the time of final assembly of the pallet and thus is a less desirable structure than that shown in Figures 1 and 2.

From the foregoing it will be evident that the construction described provides for the assembly of a pallet from materials which may be substantially completely prepared in a form of parts and which requires only minimum of labor at the time of final assembly. The slats will of course be cut to length and provided with holes of proper diameter to receive the cylinders and the cylinders, and particularly those described in connection with Figure 2, are substantially completely prepared prior to final assembly. Thus at the time of final assembly it is only necessary to stack the parts in their proper arrangement and to flange the cylinders to secure the pallet in assembled condition.

Figure 4:
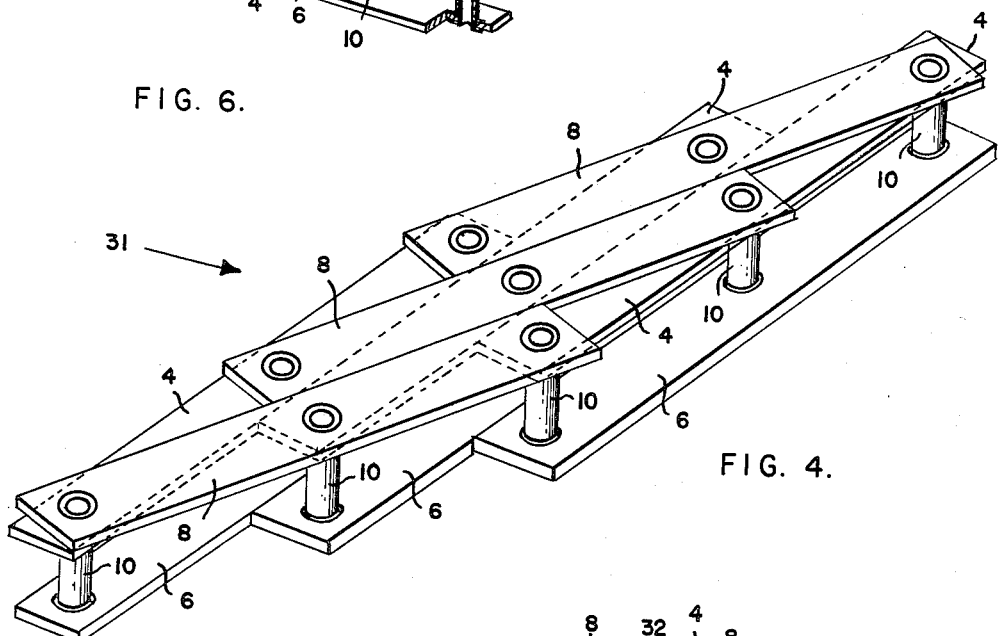
Figure 4 is a perspective view of an assembled pallet in collapsed or parallelogrammed form.

In Figure 4, as indicated generally at 31, is shown a pallet as described in connection with Figure 1 which includes a pair of spaced parallel slats 4 and 6 forming upper and lower sides of the pallet and slats 8 extending across and on top of the upper slats 4. The slats 4 and 8 are held in pivoted relation with each other and slats 4 and 6 are held in spaced relation with each other by means of cylindrical joiner-spacers 10.

In Figure 4 the pallet is shown in a collapsed condition in which the slats have been pivoted around the joiner-spacers 10 to the extent that the slats 8 and the slats 4 are lying in engagement with each other. It will of course be evident that if any of the slats 4, 6 or 8 are wider than the other slats that these slats will be the first to engage and will limit the degree of collapsing.

However the important consideration is that, as will be evident upon viewing Figure 4, the assembled pallet as shown in Figure 1 may be collapsed as shown in Figure 4 and thus caused to occupy a greatly reduced space and accordingly be much more easily handled and stored.

Figure 5:
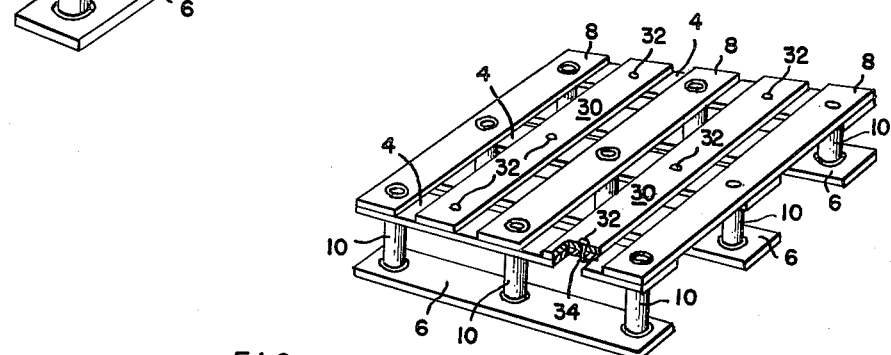
Figure 5 is a modification of the form of the invention shown in Figure 1.

In Figure 5 is shown a modification of the pallet shown in Figure 1 including the slats 4, 6 and 8 and the joiner-spacers 10 as described in connection with Figures 1 and 2. In Figure 5, however, additional slats 30 are positioned between the slats 8 and affixed to the slats 4 by means of nails or nail-type staples such as shown at 32 preferably having a curled or locking pointed end as indicated at 34. It will be evident that this structure still permits a certain degree of collapsing of the pallet.

If, on the other hand, it is desired to have a plain, uninterrupted top on the pallet or if it is desired to have a non-collapsable pallet, the slats 30 may be widened so as to completely fill the spaces between adjacent slats 8. If slats such as the slats 30 are desirably employed and collapsing is not particularly desired the slats 30 may be affixed to the slats 4 by means of the conventional U-shaped staple.

Figure 6:
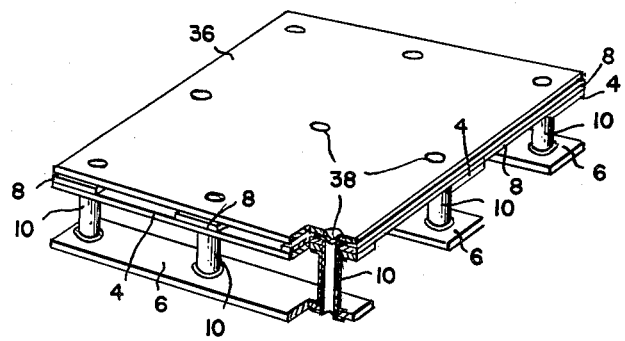
Figure 6 is a showing of the pallet shown in Figure 1 covered by a cover sheet having dimples engaging portions of the pallet for holding the cover sheet in position which will be hereinafter described.

If it is desired to provide a pallet with a substantially smooth one piece top surface yet retain the collapsing feature an arrangement can be employed as shown in Figure 6 which includes the slats 4, 6 and 8 as described in connection with Figure 1 to be held in spaced relation by joiner-spacers 10. Positioned over the pallet is a panel 36 provided with dimples 38 located to enter the upper opened ends of each of the joiner-spacers 10. It will be evident that the sheet 36 will be held in position on top of the pallet by the weight of even a moderately heavy load positioned thereon and yet the sheet may readily be removed from the pallet and the pallet collapsing for storage as previously described. The sheet 36 may be formed of a fibrous material, sheet metal, paper, or other deformable material which may be provided with dimples 38. Alternatively the sheet may be a smooth undeformed sheet having suitable means attached thereto to provide the same effect as the dimples 38 in cooperation with the joiner-spacers 10.

From the foregoing it will be evident that the invention provides a simple, inexpensive, readily assembled pallet structure capable of being reduced to a minimum space occupying condition for storage and capable of being variously modified to provide a smooth uninterrupted pallet top.

What is claimed is:

1. A pallet comprising a plurality of pairs of slats in spaced parallel arrangement forming opposite sides of a pallet, slats extending transversely of and adjacent to the slats of said pairs on one side of the pallet, support means spacing the slats on opposite sides of the pallet and securing said transversely extending slats in relation to the adjacent slats of said pairs, said support means including hollow members each extending between and through said slats on opposite sides of the pallet and providing means retaining the slats on opposite sides of the pallet in spaced relation, and a sheet of material positioned over said arrangement of slats and including means for engagement with said hollow members providing for locating the sheet on said arrangement of slats.

2. A pallet comprising a plurality of pairs of slats in spaced parallel arrangement forming opposite sides of a pallet, slats extending transversely of and adjacent to the slats of said pairs on one side of the pallet, support means spacing the slats on opposite sides of the pallet and securing said transversely extending slats to the adjacent slats of said pairs, said support means including cylindrical members each extending between said slats on opposite sides of the pallet, having radially extending flanges for retaining slats thereon and for retaining the slats on opposite sides of the pallet in spaced relation, and a sheet of material positioned over said arrangement of slats and including dimples adapted to fit into the end of the cylindrical members and locate the sheet on said parallel arrangement of slats.

References Cited in the file of this patent

UNITED STATES PATENTS

| 762,978 | Baessler | June 21, 1904 |
| 775,263 | Buckley | Nov. 15, 1904 |
| 1,476,968 | Herle | Dec. 11, 1923 |
| 2,597,411 | Vankrimpen | May 20, 1952 |
| 2,614,689 | Miller | Oct. 21, 1952 |

FOREIGN PATENTS

| 709,051 | Great Britain | May 12, 1954 |
| 914,237 | Germany | June 28, 1954 |